_United States Patent Office_ 2,957,133
Patented Oct. 18, 1960

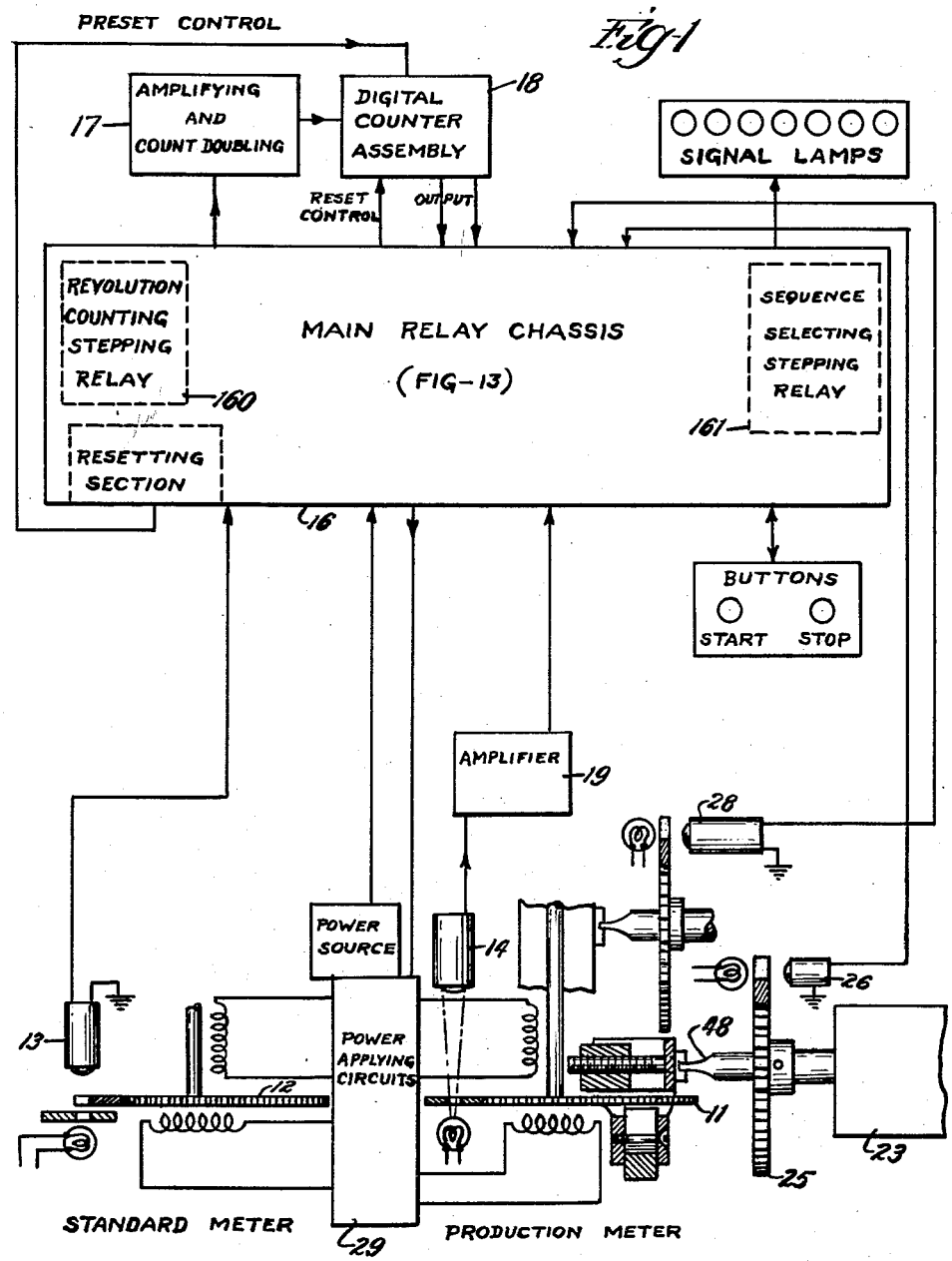

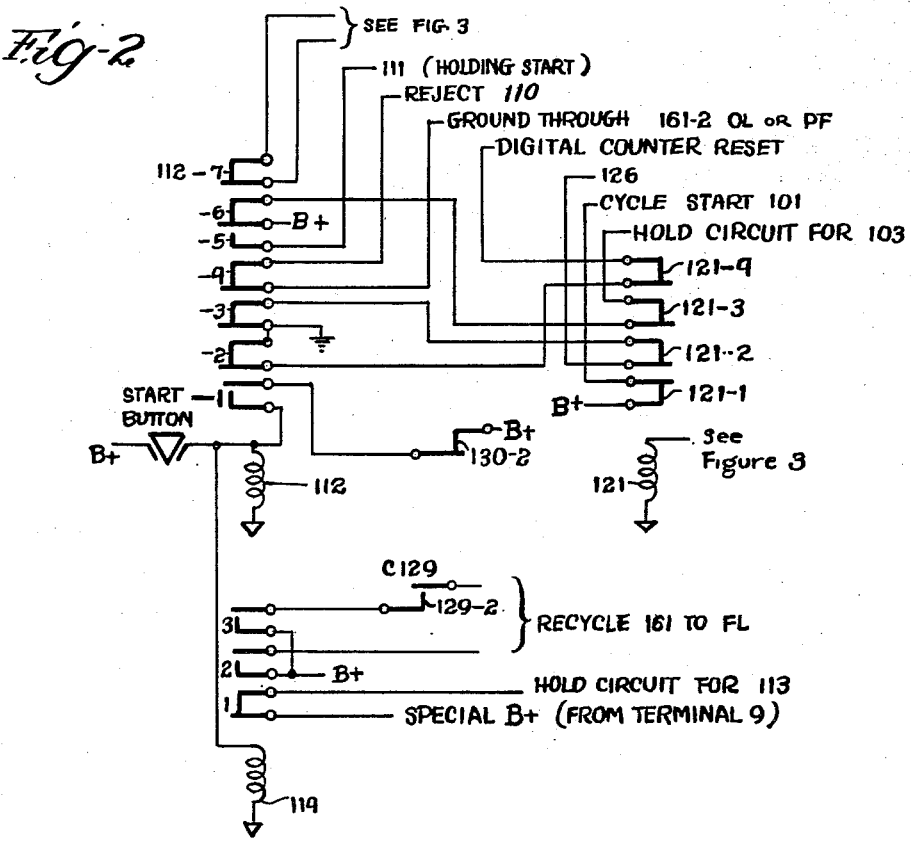
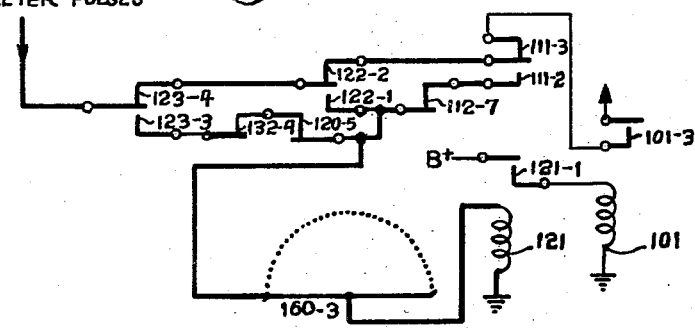

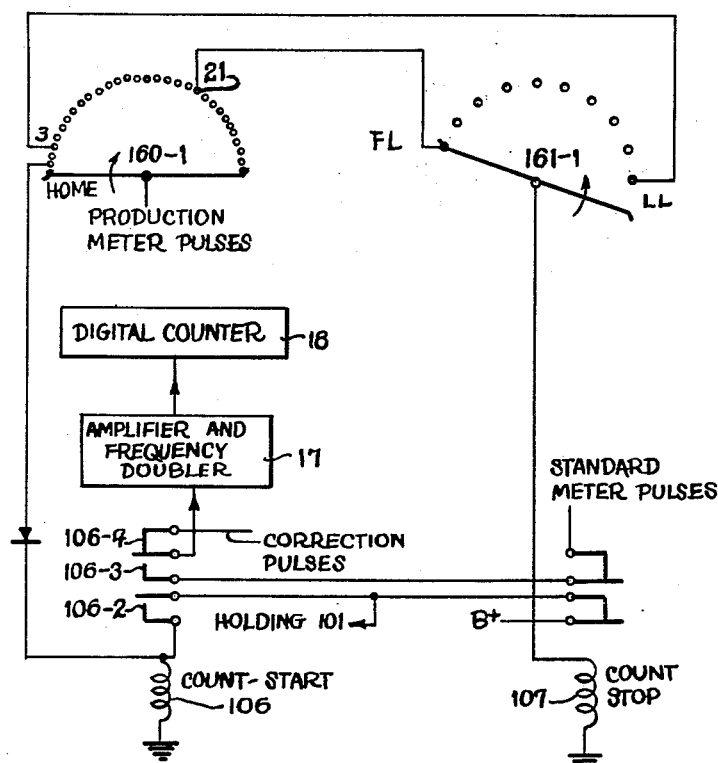
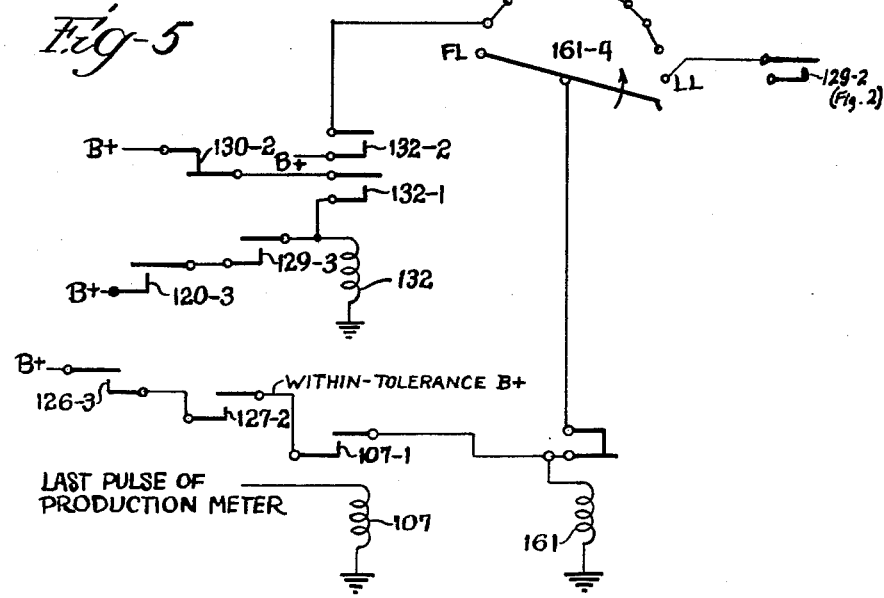

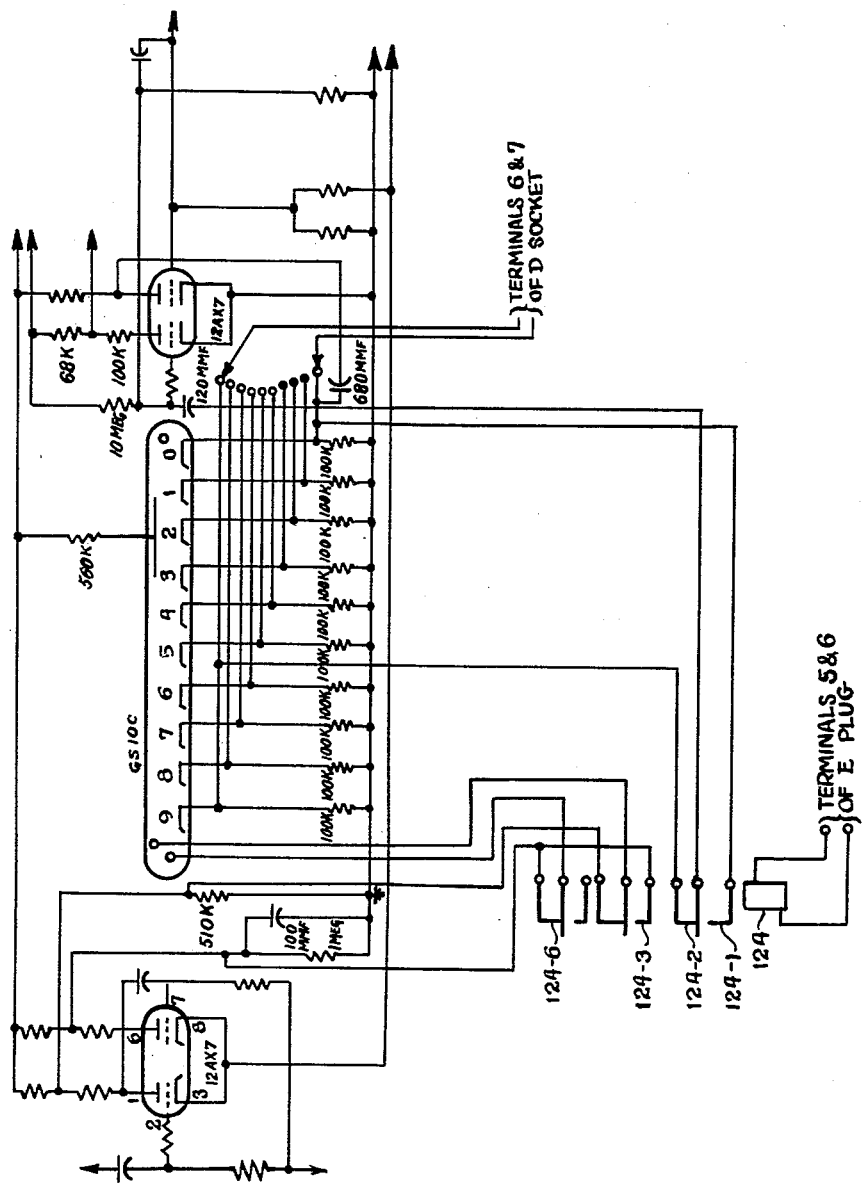

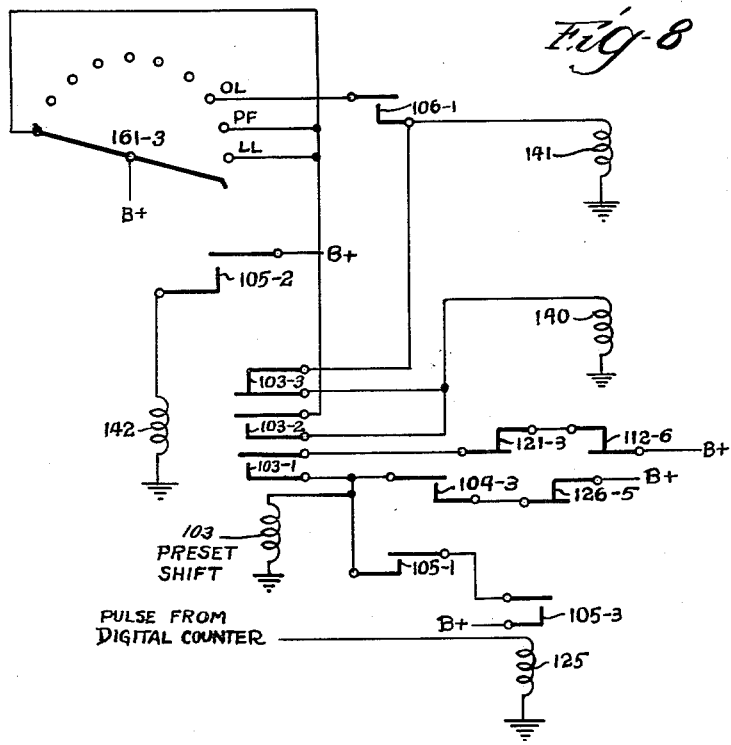
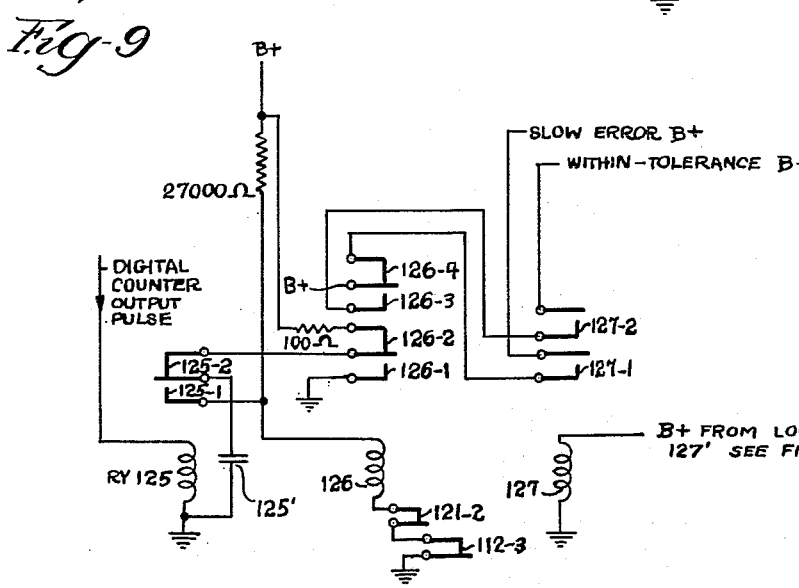

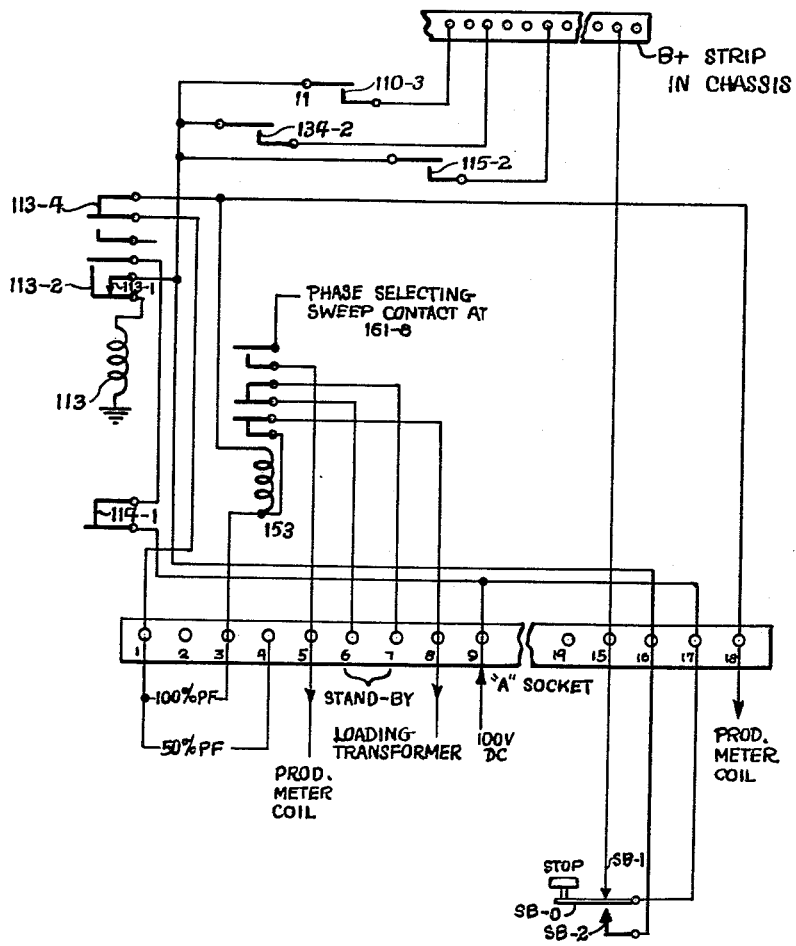

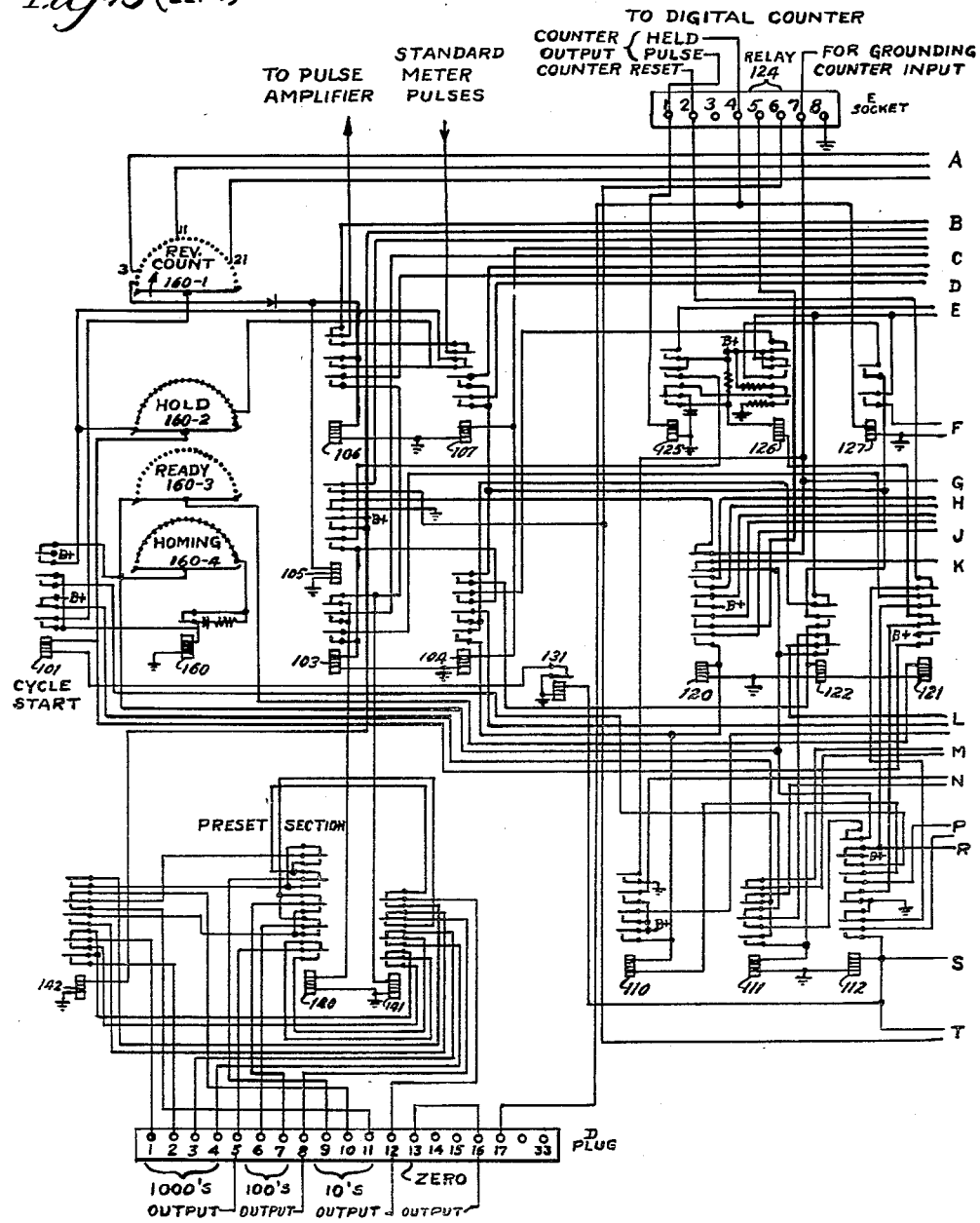

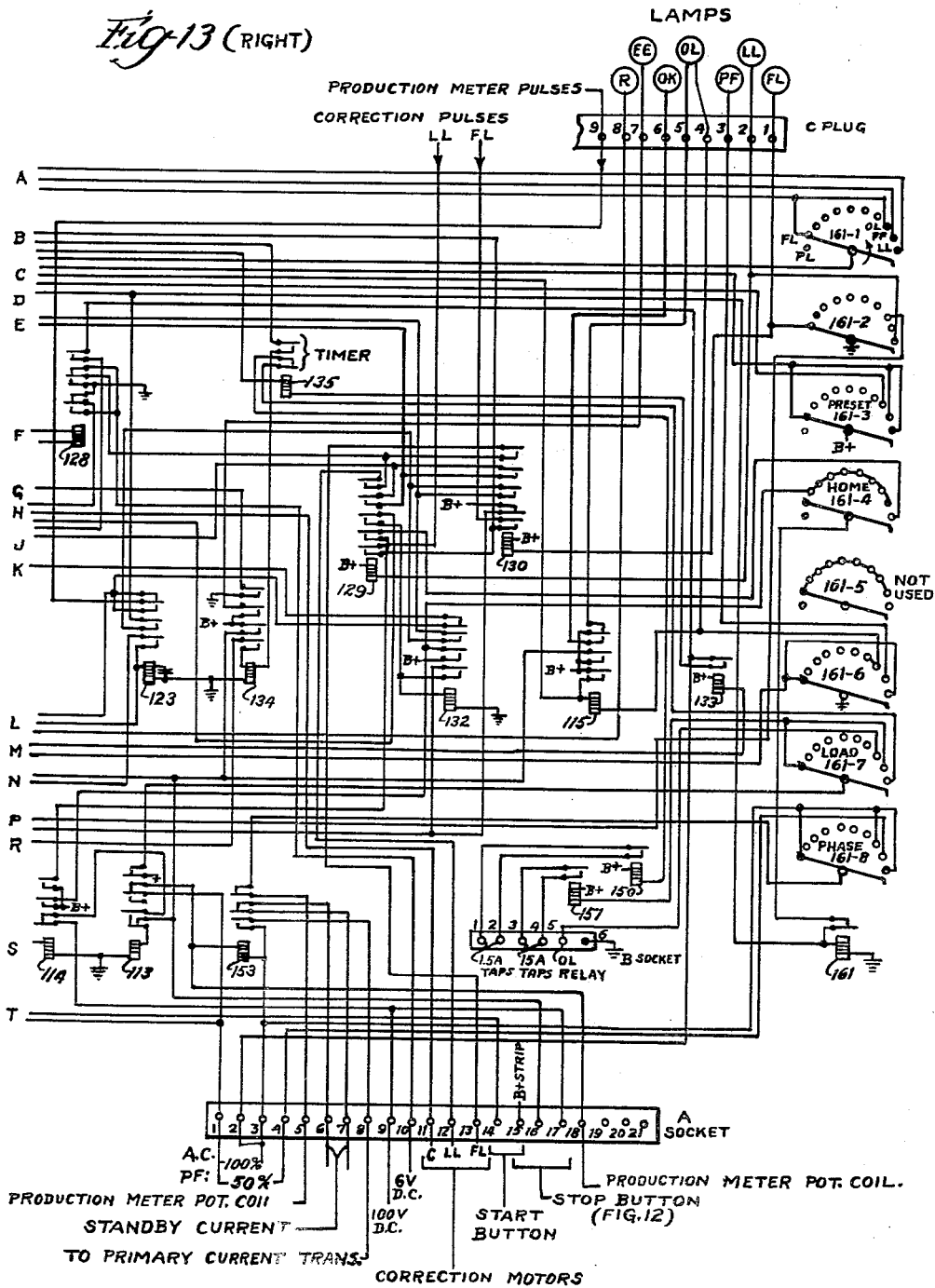

2,957,133

AUTOMATIC METER CALIBRATION

George N. Burkhart, Jr., Brookston, Ind., Richard K. O. Lee, Honolulu, Hawaii, and Paul E. Pitt, West Lafayette, Ind., assignors to Duncan Electric Co., Inc., Tippecanoe County, near Lafayette, Ind., a corporation of Indiana Filed May 14, 1958, Ser. No. 735,160

14 Claims. (Cl. 324—74)

The calibrating of watthour meters, such as the ordinary electricity meter of the home, is an exacting task. Even after preliminary adjustment such as the phasing adjustment has been completed, each meter coming off of the production line must be carefully adjusted and checked to satisfy very high standards of accuracy.

The common method of calibration basically involves comparison with a "standard" meter, a meter of known accuracy and usually of special construction and which is given special care. This standard meter and the production meter are subjected to common energization so that they should run at the same speed or at a known ratio of speeds.

Present high standards require at least four calibration tests:

First there is a comparison run at rated load, which is more commonly called full load (FL). Usually a calibrating adjustment is necessary in connection with this run to bring the production meter to accuracy at full load, and this adjustment is called the full load adjustment. Next, a comparison run is made at light load (LL), conventionally 10% of full load. The meters are commonly provided with a separate device for adjusting the meter to accuracy at light load, and such an adjustment usually needs to be made in connection with the light load comparison run. Of course, if the meters have been subjected to some preliminary calibration, adjustments in connection with these final test runs will not be needed so frequently. If any appreciable light load adjustment is made there should be a repeat of the full load comparison run, possibly with a new full load adjustment, to be followed in turn by a repeat light load comparison run.

Two additional comparison runs are made, without adjustment, to make sure that the meter is sufficiently close to accuracy under extreme conditions for which there is no easy adjustment. One of these is a comparison run at full load but with only 50% power factor instead of the unity power factor used in the previous runs. Unity power factor means that there is no phase lag between the alternating current and its voltage by which the meters are energized. Under many load conditions actually encountered, a phase lag results. There is a corresponding reduction in the power consumption, which must be accurately reflected by the meter speed.

The fourth comparison run which is commonly made is for checking the accuracy of the meter under extreme-load conditions, called overload (OL). Under the present high standards of meter performance, each production meter is energized with 500% times the rated load during this overload calibration run. Since no overload calibration adjustment is provided, the extreme accuracy required for the full load and light load calibrations is not required, but nevertheless a meter is rejected if under overload it fails to come within a fairly narrow range. Meter manufacturers commonly hold their products to a narrower tolerance than is required by their customers or by authorities.

According to the preferred and illustrated form of the present invention, a meter may be placed on the calibration rack, the start button pressed, and thereafter all of the foregoing tests and calibrating adjustments are performed automatically. Of course, simplified versions of the invention might perform less than the entire set of operations.

Preferably calibration accuracy during the comparison run is determined through the use of a digital counter counting peripheral demarcations on the rim of the disk in the standard meter which pass a given point during a predetermined number of revolutions of the disk of the production meter. This system was taught by one of the present applicants, George N. Burkhart, Jr., in previous applications, namely Serial No. 528,236 filed August 15, 1955, and Serial No. 323,278 filed Nov. 29, 1952. This system permits the determination of accuracy with a degree of exactness not previously attainable in practical mass production.

Additional objects and advantages of the invention will be apparent from the following description and from the drawings.

*Designation of figures*

Figure 1 is a highly diagrammatic representation showing primarily the functional relationship between the various parts of the invention. The relay chassis, shown more completely in Fig. 13 and where most of the novel features are found, is represented by a large rectangle.

Figure 2 is a simplified diagram of parts of the relay chassis relating especially to starting and restarting the equipment.

Figure 3 is a diagram of similar character relating especially to the energizing circuit for restart relay 121.

Figure 4 is a similar diagram relating especially to the portions of the circuit for starting and stopping the comparison count.

Figure 5 is a similar diagram relating especially to the sequence stepping switch in its normal advance to the next test function and its return after a light load correction to the initial or full load position for repeating the full load test.

Figure 7 is a diagrammatic representation of portions of one stage of a digital counter, showing especially improvements made in it for use with the present invention.

Figure 8 is a simplified diagram of portions of the circuit of Fig. 13 relating especially to the control of the preset relays for presetting the digital counter.

Figure 9 is a diagram of similar character showing relays for interpreting the signals received from the digital counter.

Figure 12 is a diagram of similar character showing especially the stop button and its relationship to important elements of Fig. 13.

Figure 6:
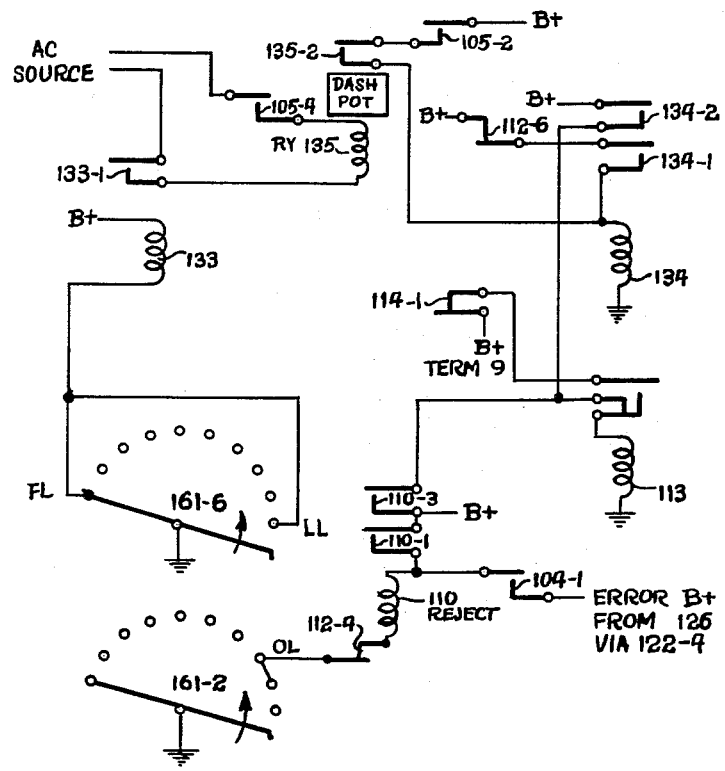
Figure 6 is a similar diagram showing especially the elements which cause stoppage of the test sequence when a meter must be rejected due to failure to come within tolerance on the power factor or overload comparison runs or due to such slow operation during the full load or light load tests that correction by calibration adjustment ought not to be attempted.

Figure 13 (Left) together with Figure 13 (Right)

jointly comprise Figure 13 which is a circuit diagram for the main relay chassis forming the heart of this invention.

General description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

As indicated in Fig. 1, the invention involves the comparison of the speed of rotation of a disk 11 of a production meter with the speed of rotation of the disk 12 of a standard meter. The basic details of the comparison system indicated are known in the industry and are more fully disclosed in the prior Burkhart application Serial No. 528,238, the disclosure of which is herein incorporated by reference. To understand the present invention it is sufficient to note that a photoelectric cell 13 is actuated by a light beam intermittently interrupted by teeth on the periphery of disk 12 to count the teeth as they pass the photocell 13. Likewise a photocell 14 is provided to count the revolutions of disk 11. In the Burkhart application this photocell produced one impulse per revolution. This is acceptable here, but in the illustrated form it counts the anti-creep holes in the disk of which there are conventionally two so that it provides two impulses per revolution.

The standard meter pulses from photocell 13 are delivered to the main relay section 16 which at the appropriate time starts delivering them to amplifying and count-doubling assembly 17 which in turn delivers two-impulses-for-one to the digital counter assembly 18.

The photocell 14 delivers its pulses to an amplifier 19 which in turn delivers them to main relay chassis 16. This delivers them at the appropriate time to a stepping relay 160. The second pulse delivered causes the digital counter to start counting. The digital counter continues to count the double pulses from photocell 13 until the correct number of revolution pulses has been counted by relay 160 whereon the comparison count is discontinued and the main relay chassis proceeds to interpret the results and act upon it. If the production meter is within tolerance, the sequence controlling step relay 161 steps forward to set up the circuit for the next comparison test, or if all of the comparison tests have been made and passed, an "O.K." signal is illuminated. If the test run shows that the production meter is not within the predetermined tolerance for that run, the main relay chassis 16 does either of the following:

(A) It causes the appropriate calibrating motor 23 (only one of the two provided being shown) to drive the appropriate calibrating screw of the production meter in the right direction to correct its fault. When the fault has presumably been exactly corrected, stepping relay 161 steps ahead to cause the next appropriate comparison test to be made.

(B) If the error detected is of a nature such that it is not correctable (or not appropriately corrected by calibration adjustment) the entire testing procedure is stopped and a "Reject" signal is illuminated.

When a calibrating adjustment is made, pulses are transmitted showing the amount of this adjustment as it progresses. These pulses are derived from either photocell 26 if the full load calibration adjustment is being changed, or from photocell 28 if the light load calibration is being changed. Both adjusting devices are diagrammatic, and perhaps not even properly placed. During either correction, the pulses are delivered by the main relay chassis through the amplifying and doubling unit 17 to the digital counter, which is caused to count backwards or forwards depending on the direction of calibration adjustment being made. In effect, the digital counter now compares the amount of adjustment made with the degree of inaccuracy previously measured, and when the right amount of calibrating adjustment has been made, it transmits an impulse to the main relay chassis 16 to cause cessation of the calibrating adjustment and to actuate sequence-controlling stepping relay 161.

Among the other functions of the sequence-control stepping relay 161 is that of selecting the right energization of the meters, particularly of the production meter. The energizing circuits are not new with this invention and therefore have been merely represented by circuit box 29.

Main relay chassis

The relay chassis 16 is fairly completely indicated in Fig. 13 and details of it are indicated in most of the other figures. It may be helpful to point out that the relays are numbered in groups by their functions. Also the contacts of the various relays may be identified by adding a suffix to the relay number, the suffix corresponding to the position of the contact counting away from the relay. Thus the contact operated by relay 101 and closest to it is contact 101-1. The contact numerals are rarely applied in Fig. 13, since most discussion will be with reference to other figures. In the other figures, the contacts may not all be shown and hence the first shown may be –2, since it is the second contact of the same relay in Fig. 13.

Relay list

For convenience most of the relays have been given names indicative of their function, and a unified list of them will be helpful in studying the drawings.

101—Cycle start relay, for starting each of the cycles in which a test run is included.
102—Reserved for a relay in amplifier 19, not shown.
103—Preset shift, for causing a change in the number to which a digital counter is preset.
104—See 107.
105 and 106 are count start relays. A single relay could be used, as the coils are connected in parallel, but two were chosen for reasons of economy in view of the number of contacts to be operated.
107, together with 104 which is in parallel with it, are the count stop relays actuated by the final revolution count pulse to stop the counting of the standard meter pulses.
110—Reject relay.
111—Holding start relay.
112—Start button relay.
113—Stand-by relay controlling power to meters.
114—(in parallel with relay 112 and to be considered with it).
115—"O.K." relay.
120—Correction relay.
121—Restart relay to actuate cycle start relay 101 when not actuated in response to the start button.
122—"Last test passed" relay.
123—"Correction-needed" relay.
124—Digital count reversing relay (in Fig. 7).
125—Digital count output receiver relay.
126—"Within-tolerance" relay.
127—"Over-tolerance" relay.
128—Correction reversing relay.
129—Light load test relay.
130—Full load test relay.
131—Clearing relay.
132—"Return to full load" relay.
133—Timer preparing relay.
134—"Meter too slow to correct" relay.
135—Timer relay.
140, 141 and 142—Digital counter preset relays.

150—Light load current relay.
151—Full load current relay.
153—Power applying relay.
160—Revolution-counting stepping relay.
161—Sequence-controlling stepping relay.

Preliminary preparation

Once the equipment is set up, the only initial preparation required as each meter is to be tested is to place the production meter on the test rack (connections being made automatically), placing the calibrating powered screwdrivers in position ready to turn the adjustment screws of the meter if required, and pressing the start button.

Starting circuitry (Fig. 2)

The start button may be located at any convenient position. Connections from the two contacts it closes extend to terminals 14 and 15 of the A socket. The circuit result is seen in Fig. 2.

The start button connects start button relays 112 and 114 to the source of the power. The power contemplated is the plus side of a 100 v. direct current source, the negative side being connected to ground. Thus the start button causes energization of relays 112 and 114. If sequence-stepping relay 161 is not yet in the starting position for the full load test, start relays 112 and 114 will be held actuated by a holding circuit through contacts 112-1 and 130-2; and contact 114-2 supplies the B power to the homing contacts of level 161-4 to step sequence relay 161 to its starting or full load test position. Contact 114-3 may also be needed for this stepping to full load position.

Contact 114-1 interrupts a circuit for standby relay 113 so that test power may be applied to the meter instead of standby power which is applied to the standard meter during intervals between tests, to keep it running at all times for maximum accuracy.

As can be determined by studying out Fig. 2 and Fig. 13, the other contacts of relay 112 cause the various parts to move to their proper positions for start, in case they were not already there. To a large extent these positions are as shown in Fig. 13. An important contact to mention is contact 112-2, which interrupts the ground connection in the reset circuit of the digital counter causing the digital counter to return to zero.

Start relays 112 and 114 release when the start button is released, unless held by the holding circuit for these relays, and in that event are released by contact 130-2 upon energization of the relay 130 when the contact at level 161-2 reaches the full load position.

The start button also energizes clearing relay 131 which releases cycle-start relay 101. The closing of its contact 101-5 connects the homing level 160-4 of revolution-counting stepping switch 160 so that it returns to the homing position.

Start of cycle

Each test cycle starts when relay 101 is energized. The circuit by which it is energized is indicated in Fig. 3. Relay 101 may be seen at the extreme left of Fig. 13, but the explanation here is with respect to Fig. 3, where it is shown on the right. Relay 101 is energized by energization of relay 121 and its closing of its contact 121-1 which connects the power to relay 101. In the case of the initial starting by the start push button, the energization of relay 121 will result when the home contact of level 160-3 is closed and start button relay 112 has released to close its contact 112-7. By this time the other contacts involved in the heavy line circuit in Fig. 3 will have been closed. The only other one of these contacts which represents an energized relay is contact 111-2, relay 111 having been energized by contact 112-5, and being held energized at this stage through its contact 111-1. The source of the meter production pulses indicated on Fig. 3 is the B voltage output of amplifier unit 19 of Fig. 1 which is transmitted to the relay chassis of Fig. 13 through terminal 9 of the C plug shown above Fig. 13 (right).

Test cycle

When relay 101 is energized as indicated under the previous heading, the closing of its contacts 101-4 connects the battery through a holding circuit for relay 101 extending through level 160-2 of stepping relay 160, Fig. 13 (left). The closing of relay contact 101-3 connects the production meter pulse circuit to the stepping coil of relay 160 and at the same time contact 101-1 connects this same pulse circuit to the sweep contact at level 160-1. At the moment, however, the sweep contact lies on an idle home contact so that the first pulse received from the production meter has no effect at this point but actuates stepping relay 160 one step as a preliminary precount step which eliminates the danger of fractional revolutions. In this new position the sweep contact at level 160-1 will have set up the count-start circuit so that the next meter pulse starts the count comparison run by initiating the digital count as explained in the next section. Each production meter pulse thereafter steps the revolution counter 160 one more step until a production meter pulse is transmitted by sweep contact at level 160-1 of relay 160 to a circuit previously set up by the full load position of sequence relay 161.

Starting and stopping digital counter

As seen in Fig. 4 when the sweep arm at level 160-1 has been advanced one step the next production meter pulse delivered to it will be transmitted to relay 106. Relay 106 closes contact 106-1 to complete a holding circuit for relay 106 so that it remains energized until deenergized by relay 107. The closing of contact 106-2 connects the circuit on which standard meter pulses are being received to the frequency-doubler 19 and digital-counter assembly 20 of Fig. 1.

The digital counter ordinarily continues to count until the sweep contact at level 160-1 has been advanced by successive production meter pulses so as to count the correct number of revolutions of the production meter disk. In the case of the full load test the comparison run of 10 revolutions of the production meter is desired. This means 20 production meter pulses after the pulse which started the comparison. As seen in Fig. 4 the appropriate terminal at level 160-1 is connected to the full load terminal at level 161-1 of sequence-selector stepping relay 161. The sweep arm at this level connects this terminal to count-stop relay 107. Hence after the sweep arm at level 160-1 has moved to the appropriate terminal, the next production meter pulse stops the test by energizing count-stop relay 107. As seen in Fig. 7, the opening of contact 107-4 immediately breaks the circuit by which the standard meter pulses are transmitted and therefore the counting by the digital counter ceases. At the same time contact 107-3 opens the holding circuit for relay 106 so that it is deenergized, and also breaks the holding circuit for relay 101 so that it is deenergized, and stepping relay 160 steps ahead back to the home position.

Presetting of digital counter

The type of digital counter at present preferred is the glow transfer type, which is easily reversible. Presetting of such counters to provide an output pulse when the counter indicates the number for which it is preset is already well known. For example, if we refer to Fig. 7 each of the digital cathodes shown in the glow-tube has been shown as connected to one of the terminals arranged in an arc. According to past practice a pivoted switch swings to any one of these terminals to deliver a pulse from it to a coincidence-actuated triggering circuit which in turn produces the output impulse when the preset number is reached. Because the present invention contemplates using two preset numbers during one test run, and a third if correction is found necessary, and furthermore will not use the same three numbers for all of the test run, extensive and at times high speed changing of the presetting of the digital counter is necessary. Accordingly, the manipulation of the pivoted contact is impractical and relay shifting of the connections has been substituted. To facilitate changing the setup, a set of plug-in type contacts can be substituted for the arcuate row of terminals and plug-in leads extended from the desired ones to the correct relay terminals.

Inasmuch as four digits are used for each of the numbers, and six different preset numbers are to be used, it might seem that a very high number of relays and relay contacts would be necessary. In fact, however, only three relays are needed for these presetting connections and the maximum number of contacts on these relays is ten. The circuit which has been worked out is shown in the lower left corner of Fig. 13 (left). The four necessary connections to the coincidence-actuated triggering units are terminals 5, 8, 11 and 16. In this discussion all the reference to the terminal numbers will be terminal numbers on the D plug. Terminals 1, 2, 3 and 4 may be respectively plugged to four different cathode-connected terminals of the glow tube so that any one of these may be connected by the relay system to terminal 5 for transmitting a pulse to the coincidence unit when its digit is reached by the counter. Likewise either of terminals 6 and 7 may be plug connected to cathode-connected terminals of another glow-tube for connection of either one to another segment of the coincidence-actuated triggering unit. Similarly any of terminals 9, 10 and 14 may be connected to terminal 11. Terminal 13 is directly connected to terminal 16, because all preset numbers are to end in "0." The "0" cathode of the "units" counter tube will therefore always be connected to one section of the coincidence unit.

The contemplated methods of plugging in involve selecting between three of the tens glow-tube for another section of the coincidence unit; between two cathodes of the hundreds glow-tube for a third section of the coincidence unit; and between four terminals of the "thousands glow-tube" for the fourth section of the coincidence unit.

In the present state of the equipment the numbers which may be preset with the plugging connections presently preferred and their manner of being preset are as follows. The first number for which the digital counter is to be preset is 4990. This is preset by actuating relay 142 while relays 140 and 141 are left released. The circuits for energizing relays 140, 141 and 142 are shown in Fig. 8. The circuit for energizing relay 142 may simply energize it whenever the count relays 106 and 105 are energized. Thus it has been shown as extending through contact 105-2 directly to a source of B voltage. In other words, when a count is in progress and no other influence intervenes to change the preset, the preset number will be 4990.

The next number to be preset is 5010. This number is preset by actuation of relays 142 and 140 while relay 141 is left deenergized. This, in other words, merely requires the additional actuation of relay 140. This is accomplished by the first output pulse provided by the digital counter when it reaches the number 4990 for which it was first preset. This output impulse of the digital counter is received by the relay chassis through terminal 1 of the E socket (Fig. 3, left). As seen also in Fig. 9 this pulse actuates relay 125. As seen best in Fig. 8, contact 125-3 of relay 125 then connects the source of B voltage through closed contact 105-1 to the coil of relay 103. Upon energization, this coil is ordinarily held actuated by its contact 103-1 until reset relay 121 is actuated. Contact 103-2 of relay 103 closes the final connection of the actuating circuit for relay 140, this circuit extending also over to the full load, light load and power factor terminals of level 161-3. The number 5010 is used for all of these test runs.

The next number for which the digital counter may need to be preset is 5000, in case an error was detected and calibration is to be made. This number is preset by actuation of relay 140 while relays 142 and 141 are released. For this purpose, relay 142 is released by opening of contact 105-2, this occurring at the instant that the counting was stopped by the final revolution-counting pulse. Since nothing occurs at this time to deenergize relay 140, it remains energized.

No other numbers are needed until the overload count at which time the first preset number needed is 0990. This presetting is accomplished by energization of all three of the relays 142, 140 and 141. The 142 will be energized as before because of its being during a run. 140 and 141 are now in parallel by virtue of the fact that back contact 103-3 will remain closed until the first impulse from the digital counter is received. They are thus jointly supplied with B power through contact 106-1 and the terminal at the overload test terminal of level 161-3 of sequence-stepping relay 161. As soon as this number is reached on the digital counter, the digital counter produces the output impulse which, as previously indicated, indirectly causes the actuation of relay 103. This breaks the circuit for relay 140 at contact 103-3, thereby leaving relays 142 and 141 energized while relay 140 is deenergized. This presets the digital counter for the number 1010 which is the number chosen for the upper tolerance limit for the overload run.

*Interpretation of digital counts*

When the digital counter reaches the lower of the two tolerance numbers for which it has been preset, it will transmit an impulse. As seen in Fig. 9 this pulse momentarily actuates relay 125. This closes contact 125-1 which actuates the "within-tolerance" relay 126. At the same time, a locking relay within the digital counter assembly 18 establishes a circuit through terminal 4 of E socket which energizes and holds energized relay 127.

If the pulses counted by the digital counter continue until the second preset number is reached the second pulse will be transmitted by the digital counter to relay 125 to again momentarily energize the relay 125. This time, closing of contact 125-1 releases tolerance relay 126. The circuit by which relay 126 is held in the meantime and is released by this second actuation of 125 can be varied, but an interesting form thereof is shown in Fig. 9. The holding circuit for relay 126 is through a resistance which decreases the current to a value just enough to safely hold relay 126. The resistance contemplated for the particular relay and voltage planned is a 27,000 ohm resistance. While relay 126 is actuated its contact 126-1 together with contact 125-2 of relay 125 causes complete discharge of a capacitor 125'. Now when relay 125 is actuated, contact 125-1 will connect capacitor 125' across relay 126, momentarily diverting enough of the holding current from relay 126 so that this relay is released. Now relay 126 opens its contact 126-1 and closes its contact 126-2, with the result that capacitor 125' is charged with full B voltage, so that the next time that relay 125 is energized the closing of contact 125-1 will apply the full B voltage from capacitor 125 to relay 126, to cause this relay to pull in its armature.

So long as relay 126 is energized, its contact 126-3 supplies B voltage to contact 127-2 of relay 127. Since this contact will also be closed, this B voltage is supplied to the remainder of the within-tolerance circuit shown in Fig. 5 and to be described. But as seen in Fig. 9, as soon as the within-tolerance relay 126 is deenergized, contact 126-3 opens to deenergize the within-tolerance circuit. At the same time contact 126-4 is closed so that (contact 127-1 of relay 127 being closed) B voltage is supplied to the over-tolerance, or "slow error" circuit.

*Sequence advance when no error*

Now, assuming that the production meter is within tolerance so that the count is stopped while the tolerance relay 126 is energized, we may refer to Fig. 5. The last pulse of the production meter which, as previously indicated, would energize count stop relay 107 also closes contact 107–1 of this relay to transmit the within-tolerance voltage previously traced through contact 127–2 of relay 127. This voltage is transmitted, as seen in Fig. 5, through the coil of sequence relay 161 thereby actuating this relay to step to its next position. Only a single step is produced in this manner because the actuation of relay 107 was by pulse only, so that it only transmits a pulse to relay coil 161.

The remainder of the circuit shown in Fig. 5 merely comes into use in the event of an error in a subsequent test.

Correction of calibration

One important purpose of this invention is to provide a full load calibrating adjustment in the event that the production meter is found by the first count not to be within tolerance. This is accomplished as follows.

Figure 10:
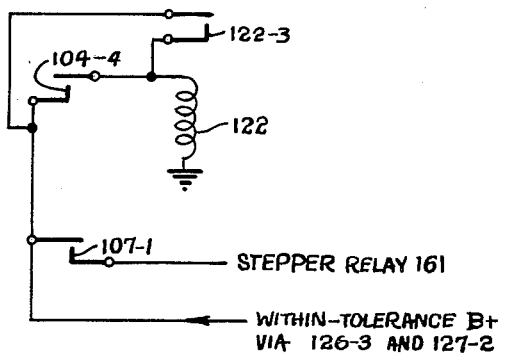
Figure 10 is a diagram of similar character showing especially some portions of the energizing circuit for relay 122.
Figure 11:
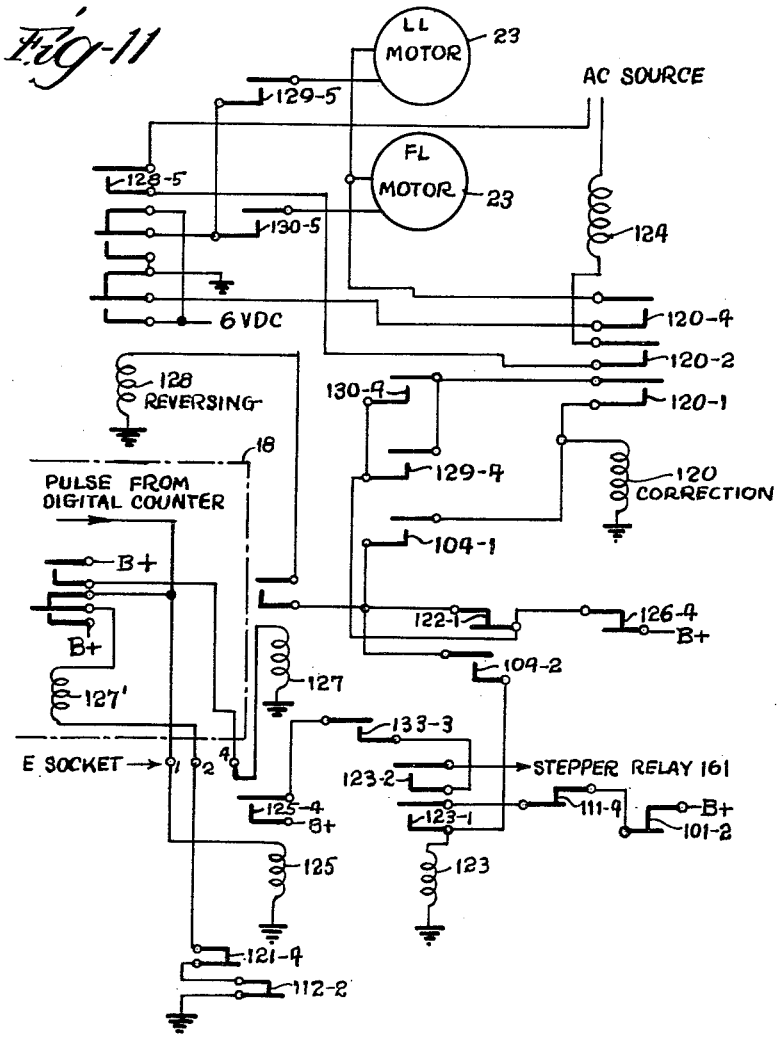
Figure 11 is a diagram of similar character showing especially important elements of the circuitry involved in making calibration adjustments when an error is found in the full load or light load comparison runs.

When the last production meter pulse energizes relay 107 it also energizes relay 104. These relays are connected in parallel and in fact a single relay could be used if enough contacts were provided. Two pertinent contacts of relay 104 are shown in Fig. 11. Contact 104–1 closes a circuit to correction relay 120, provided that contacts 122–1 and 126–4 are closed. Had there been no error to correct, this circuit would be broken at both of these other contacts, and would remain broken at 122–1, relay 122 being energized as seen in Fig. 10. Contact 120–1 holds correction relay 120 actuated. The holding circuit, in the case of full load adjustment is through contact 130–4, the relay 130 being energized through a contact on sequence switch 161 whenever the sequence switch is in the full load position.

Actuation of relay 120 also closes contact 120–4 to complete the motor circuit for calibration correction. Since we are assuming a full load error, the FL motor (which may incorporate suitable speed reducing gearing) will be connected in this correction motor circuit through contact 130–5. The direction of rotation of the motor depends upon the polarity of current in this motor correction circuit, this polarity being controlled by correction reversing relay 128. If the tolerance range has been passed the over-tolerance relay 127 will remain energized and its contact 127–1 will energize relay 128 providing the polarity of current for the correction motor to turn the calibrating screw in the direction which will speed up the meter. Otherwise, relay 128 will be released and the polarity of current in the correction circuit will be such as to drive the motor in the opposite direction to turn the calibration adjustment screw in the direction to retard the meter.

As illustrated in Fig. 1, the full-load correction motor 23 not only drives the adjustment screw driver 48 but also a device for transmitting impulses. This may, for example, be a toothed wheel 25 interrupting a light beam to a photocell 26. During the full load test the photocell 26 is connected through contact 130–1 to contact 106–4. During a test count relay 106 is energized and therefore contact 106–4 is open. At the end of the test count the deenergization of relay 106 closes contact 106–4 so that the pulses from photocell 26 are transmitted to the pulse amplifier 17 so that they are doubled and counted by the digital counter the same as the production meter pulses are counted during the test run. It may be mentioned at this point that there is a similar photocell 28 for the light load adjustment and toothed wheel. Each toothed wheel should have its tooth frequency correlated to the speed of correction so that the amount of turning expected to correct any error will bring the count to the number corresponding to accuracy. In other words, if the test count stops at a count 25 short of the number representing perfect accuracy, the correction motor will drive the adjustment screw until the impulses transmitted by the correction mechanism increase the count to the number indicating accuracy. Linear (uniform) correction action is desirable.

In the case of full load testing contemplated, the presetting of the digital counter will have been changed to the number 5000 indicating accuracy so that when this number is reached an impulse will be given out by the digital counter, which terminates this phase of the cycle and initiates the next. Thus as seen in Fig. 11, the pulse from the digital counter indicating that the count indicating accuracy has been reached actuates relay 125. This closes contact 125–4, and since relays 133 and 123 are energized, contacts 133–3 and 132–2 will be closed so that the pulse from the digital counter will be transmitted to the stepping coil of sequence relay 161.

As previously mentioned, the actuation of relay 125 when, as now, relay 126 is deenergized, causes energization of relay 126. This will open contact 126–4 which removes power from the correction circuit shown in Fig. 11, deenergizing relay 120 which in turn deenergizes the correction motor.

It may be noted at this time that relay 126 must be deenergized before the next test count operation begins. This is accomplished through the contact of restart relay 121, namely contact 121–2.

Fig. 11 also shows present circuitry for energizing relay 127. A lock-relay 127 is energized by the digital counter output. It has not been shown in Fig. 13 because it happens to have been installed in digital counter assembly 18. This relay is energized by the first output impulse and remains energized until the digital counter is reset to zero by opening either of contacts 121–4 or 112–2.

Reversal of digital counter

If the production meter was slow during the comparison run, the digital counter will have run past the 5000 count, and during the correction calibration must count backwards to 5000. The reversal relay 124 for the digital counter is shown in Figs. 7 and 11. It is actuated when relays 124 and 128 are both energized, as explained under the previous heading.

When the relay 124 is energized it operates reversing contacts 124–3 to 124–6. This reverses the connections between the two electrodes within the glow-tube which are called guide pins. This reversal reverses the direction of count stepping of the space discharge current from cathode to cathode. It should be understood that the successive counting steps from cathode to cathode occur when successive input impulses are received.

It so happens that, for accuracy of indications, the transfer impulses between successive decades, as between the units and the tens glow-tube should occur at a different time when counting forwardly than when counting backwardly. When counting forwardly the transfer impulse should occur as the stepping glow leaves the 9-digit electrode. When counting backwards it should be effectuated when the stepping glow leaves the zero-digit electrode. Fig. 7 shows the necessary connections being changed by contacts 124–1 and 124–2.

It should be understood that the same full set of relay contacts shown in Fig. 7 is provided separately for each of the glow-tubes in the digit counter. However, they may all be actuated by a single relay coil 124. It is because a powerful relay would be needed that this relay coil 124 has been shown in an alternating current circuit rather than the B-voltage circuit which operates most of the relays.

Timing circuit

It is desirable in connection with the full load and light load tests to limit the runs to a length of time slightly in excess of that normally required so that meters having a defect too serious for automatic correction can be given special attention. For example, if foreign matter caused a production meter to rotate slower than would result merely from poor calibration, it is highly desirable to remove the foreign matter before the meter proceeds. Furthermore, an attempt to supply the amount of calibration which would seem to be required could result in damage to equipment. With the present form of the invention, such conditions are detected, the equipment is stopped and a signal lamp is illuminated to indicate an excessive error.

As seen in Fig. 6, the contact at level 161-6, when in either the full load or light load position, closes connections for a circuit energizing relay 133 which may be called a timer preparing relay. As a further safeguard, the connection for energizing this relay extends also through back contact 111-5 of relay 111 which is actuated by the start button.

When timer preparing relay 133 is thus energized, it closes its contacts thereby completing one portion of the circuit for timer relay 135. The type of timer relay preferred is a rather heavy duty type of A.C. voltage relay including a dash pot which according to present practice of this invention has been adjusted for a 42 sec. delay. The contacts of relay 133 connect one side of timer relay 135 directly to one line of an alternating current source. The other side of timer relay 135 extends through contact 105-4 to the other side of the alternating current source, so that the timing starts when this contact 105-4 is closed by the pulse which initiates comparison revolution counting. If the test run is completed within the required time, the circuit for timer relay 135 will be broken by contact 105-4 as relay 105 (in parallel with relay 106) is deenergized by energization of count stopping relay 107 when it is energized by the final revolution count. Thus the timer relay has no effect when the test run is completed within the allotted time. However, if the test run is not completed within the allotted time the contacts of relay 135 are actuated at the end of this allotted time. Contact 135-1 (Fig. 13) removes the load from the current coil of the meters. This is done by releasing either relay 150 or relay 151, whichever one had been chosen for the particular test by sequence selector level 161-7.

The other contact of relay 135, namely contact 135-2 (Fig. 6), connects B power with relay 134 which may be called the excessive error relay. Once actuated, this relay is held by the circuit through its first contact until start button is pressed thereby actuating relay 112 and opening its sixth contact. Contact 134-3, closed by energization of excessive error relay 134, illuminates the "Excessive Error" lamp. Contact 134-4 grounds the circuit transmitting pulses to the digital counter so that this counter continues to indicate the point it had reached when the time expired. Contact 134-2 actuates relay 113 to shift to stand-by meter energization.

*Light load test run*

When the sequence relay 161 turns counterclockwise to the 2nd position, as has been previously described, it sets up a light-load testing cycle which proceeds much as the full-load testing cycle already described.

Preliminary to the light-load test run a number of steps are accomplished. At level 161-1 (see Fig. 4) of sequence-stepping relay 161, connections to level 160-1 of revolution-counting relay 160 are changed so that the light load comparison run will last for only 1 revolution of the production meter disk instead of 10. At level 161-2 of stepping sequence relay 161 (Fig. 13 right), the shifting of the contact from the full load position to the light load position deenergizes full load relay 130 and the full load signal lamp and energizes instead light load relay 129 and the light load signal lamp.

At level 161-7, the contact changes the load to be applied to the test meter. Usually this is a special load circuit called a phantom load and the typical change would be connecting the current coil of the production meter to a 1.5 amp. tap instead of to a 15 amp. tap, other taps being changed so that the standard meter will receive 10 times the load of the production meter.

The revolution count relay 161 must be returned to the home position. As a matter of fact this is done immediately at the end of each count. When the final production meter pulse is transmitted to relay 107 it opens contact 107-3 which opens a holding circuit through level 160-2 for relay 101. The release of relay 101 closes its contact 101-5. This closes the homing circuit for stepping relay 160, through level 160-4. This causes the relay to step until it returns to the home position. Upon reaching the home position the contact at 160-3 prepares for reenergization of cycle start relay 101, when, as now, a new cycle is to start. As seen best in Fig. 3, relay 101 is energized by the closing of contact 121-1 of restart relay 121. Relay 121 in turn is energized by the production meter pulse through the circuitry shown in Fig. 3. The path which the pulse takes in Fig. 3 depends on whether or not an error had been detected. For simplification we may assume that no error was detected in which case the circuit will be through contact 123-4 and 122-1 through the home contact at level 160-3 to relay 121. If an error had been detected the path would be through contact 123-3.

Another function which must be performed before the comparison count begins is the resetting of the digital counter to zero. Digital counters are conventionally provided with a reset circuit and this is connected with terminal 2 in the E socket. The same restart relay 121 discussed immediately above actuates the resetting of the digital counter by opening contact 121-4. This breaks the connection of the reset terminal to ground and thereby causes resetting of the digital counter. It may be noted at this stage that this grounding circuit is also broken to ensure resetting of the digital counter to zero whenever relay 112 is energized by pressing the start button, the connection in this instance being broken through contact 112-2.

The test count cycle for the light load test now starts. The production meter pulse which caused the already described reactuation of relay 101, thereby caused the relay 160 to step from its home position to the next or "count start" position thereby connecting the count starter relay 106 to the count impulse circuit as was done in the full load test already described. The next pulse therefore starts the digital count as well as causing the first counting step of the revolution counter. The production meter pulse received after a full revolution stops the counts by operation of relay 107 as in the case of the full load run.

In most respects the detection of error and its direction is the same with the light load test as with the full load test. Some differences in secondary functions should be noted.

Because light load relay 129 is energized instead of full load relay 130, any error will result in driving the light load calibrating motor instead of the full load calibrating motor.

Proper calibrating practice requires that if an error is found and corrected at light load there be a return to full load before proceeding to the power factor and overload tests. Therefore the circuit chooses which shall be the next step in the sequence, depending upon the result of the light load test. If no error was found at light load, sequence stepping relay 161 is actuated to the next position as previously indicated in explanation of Fig. 5. Specifically the within tolerance voltage is transmitted to stepping relay 161, when the final pulse from the production meter energizes relay 107; contact 127-2 having been closed at the same time that the within tolerance relay 126 was energized.

If an error is found in the light load test, then upon completion of the calibration to correct this error:

First of all as described in connection with the situation after correcting a full load error, the impulse from the digital counter indicating that the correction has been completed is transmitted by relay 125 and through contact 123–2 of Fig. 11 to the stepping relay 161. This advances the sequence stepping relay to the next position, but it does not stop there. Level 161–4 (Fig. 5) has now been energized and causes continued stepping of the sequence relay 161 to return it to the full load position. The manner in which level 161–4 has been energized is by closing of contact 132–2 by relay 132 which may be called the "return to full load" relay or the "memory of light load error" relay.

Relay 132 was energized by the closing of contact 120–3 of correction relay 120 when the correction began. Relay 132 is prevented from being energized except during the light load test by virtue of the fact that this energizing circuit extends through contact 129–3 of the light load relay and can therefore be completed only when the light load relay is energized. Relay 132 is held energized through its contact 132–1 until relay 161 reaches its full load position, when full load relay 130 is energized and its contact 130–2 opens the holding circuit of relay 132.

The rerun of full load starts when relay 101 is reenergized as described at the beginning of this discussion of the light load test. The next test will be a repeat light load test. Although an error needing correction is very unlikely on this rerun, any correction would, now and always, cause a return to the full load test.

Power factor test

When level 161–4 is not energized (because no light load error was detected) sequence stepping relay 161 remains at the power factor test position to which it was advanced as previously described. In this position, before the test counting begins, the following occurs:

At level 161–2 the connection to the light load lamp is extinguished and instead a connection is made preparing the circuit of power factor reject relay 110 in case this relay may later be needed.

At level 161–6, the circuit to the timing relay is interrupted (because that circuit will not be used in the subsequent tests), and the circuit to the power factor indicator lamp is connected.

At level 161–7 the connection shifts from light load current back to full load current, in other words releasing relay 150 and actuating relay 151.

At level 161–8 the energization of the production meter voltage coil is changed from unity power source factor to 50% power factor source.

The start of the power factor test cycle is now initiated by reenergization of cycle start relay 101 as described at the beginning of the discussion of the light load test.

The proper number of revolutions for this count is chosen by level 161–1 of the sequence selector to provide five revolutions of the production meter instead of the ten at unity power factor.

The initial interpretation of error is the same as for the tests previously described, but at present no correction of calibration in connection with this run is contemplated. If the test shows the production meter to run within tolerance, sequence relay 161 is operated (by the "within tolerance" B voltage) to the next position as described in connection with Fig. 5.

If the production meter is not within tolerance on this power factor test run, the entire test procedure is stopped, the "Reject" lamp is illuminated, and the digital counter is stopped to show the amount of error. This is accomplished with the help of reject relay 110 indicated most clearly in Fig. 6. As seen in that figure, when the final count of the revolution count energizes relay 104, contact 104–1 closes to energize reject relay 110. Of course this assumes that the within tolerance relay 126 is not actuated at the time that the final count actuates relay 104.

Reject relay 110 is held actuated by its contact 110–1 until the next pressing of start button breaks its circuit by actuation of relay 112 and opening of contact 112–4. The closing of contact 110–2 connects the signal lamp for indicating "Reject" due to power factor or over load test. The attendant can tell which test the meter failed because its lamp remains lit.

The third contact of relay 110 is seen in Fig. 13 to actuate relay 113 which applies auxiliary standby current to the current coil of the standard meter. It may be noted at this time that contact 5 of relay 113 simultaneously deenergizes whichever of relays 150 or 151 was energized, to remove the test current from the meter coils.

The fourth contact of relay 110 when closed by actuation of reject relay 110 grounds the pulse input circuit of the digital counter so that that counter retains the count indication which it reached at the time of the final revolution count of the production meter.

It is apparent that when the attendant sees that the reject lamp is illuminated he can remove the production meter and place it among the rejects. Of course he will usually first make a notation to accompany it showing the digital count reading and whether this was on power factor test or overload test. In the assumptions so far described the power factor signal lamp would be lit and therefore he would note rejection by power factor test.

Overload test

If no error were found during the power factor test, the final production meter pulse causes the sequence stepping switch 161 to advance to the next position as explained in connection with Fig. 5. This is a position for overload testing. Level 161–3 changes the preset of the digital counter, because in the illustrated form of the invention it is contemplated that the digital counter will not reach the same range. For example, if a 500% overload is applied to the production meter and it is run for the same number of revolutions as under full load and if the standard meter has only one-fifth of the production meter load, the number indicating accuracy of the digital counter will be only one-fifth that which would indicate accuracy under full load. Furthermore, the relative range of tolerance for overload conditions is usually higher, and this can be selected at will (within the limits of the equipment) by the presetting. The details of this presetting were described under a separate heading.

At level 161–6 the power factor lamp is extinguished and the overload lamp is lit. The same connection also connects to ground one side of the coil of "O.K." relay 115 to prepare it for illumination which usually follows this last test.

Level 116–7 shifts the connection from the full load relay 151 to an overload relay. Because of the heavy 75 ampere current here to be controlled by the overload relay, it is not located in the main chassis but as close as practical to the power circuit involved.

At level 161–8 the connection shifts to return from 50% power factor to unity power factor.

The test cycle for the overload is initiated by reenergization of cycle start relay 101 as was described at the beginning of the description of the light load test. In the event that the final revolution count occurs when the within tolerance relay is not actuated, the reject relay 110 will be energized in the manner and with the results described in connection with the power factor test. In the event that the within tolerance relay is in energized condition at the time of the final revolution count, the contact 107–2 of the count stop relay 107 closes the circuit to "O.K." relay 115 (Fig. 13). This circuit reaches contact 107–2 through contacts 127–2 and 126–3.

"O.K." relay 115 retains itself energized through its contact 115–1 until start button causes actuation of stepping relay 161. Contact 115-2 actuates relay 113 to disconnect the test current from the meters and supply to the standard meter a standby current. Contact 115-3 disconnects the overload lamp and connects the "O.K." or "finish" lamp. This indicates that the meter has passed all of the tests conducted by this equipment, either initially or after being automatically calibrated as required.

*Removal of potential from production meters*

When relay 113 is energized at the end of every test run, it not only performs the functions already described, but also disconnects the various voltage connections for the production meter, as a matter of safety. Thus contact 113-4 opens one connection (through terminal 18 of A socket), and deenergizes relay 153. Its contact 153-5 breaks the other connection (through terminal 5 of A socket). Contact 153-1 disconnects the current transformers used for tests, and contact 153-2 completes the standby current circuit which maintains the standard meter running.

*Stop circuit*

It is desirable to be able to stop the test or any operation which is proceeding at any time and, in so doing to release all of the relays in Fig. 13, except that relay 113 should be energized in order to provide the standard meter with the auxiliary standby power and remove all power from the connecting terminals for the meters. All of this is accomplished as shown in Fig. 12. Here a stop push button moves a B power supply contact SB-0 so as to disconnect contact SB-1 and connect contact SB-2. Contact SB-1 is connected to the B power connecting strip in the chassis of Fig. 13 to which all B power connections should be made except the connection for 113 about to be described. Thus opening contact SB-1 disconnects the B power from all of the relays which are operated by B power except relay 113. The closing of contact SB-2 closes a special energizing circuit to relay 113. Upon energization, relay 113 closes contact 113-2 to close a holding circuit for relay 113 extending through back contact 114-1 of relay 114 to pin 9 of "A" socket which in turn is connected to the main source of B current, 100 volts direct current being preferred. The movable contact SB-0 of the push button switch may derive this B current from an outside source or, as shown, through terminal 17 on the "A" socket which is connected with terminal 9. Fig. 12 also shows three other paths by which relay 113 can be energized, with the effects above indicated.

*Modifications*

Although innumerable modifications may be made, a few may well be specifically mentioned.

If desired, the circuit could be changed to make a calibrating adjustment on every meter which does not score perfectly in the comparison run. This could be done with respect to full load or light load or both. However, the narrow tolerance already described is better than present commercial requirements, amounting to an error of only one fifth of one percent in either direction.

Even if still greater accuracy should be decided upon, the retention of the light load test in its present form, perhaps with an even narrower tolerance range, may continue to be preferred. There are two reasons why the tolerance might be preferred for the light load test, even when not preferred for the full load test. One is that a one fifth of one percent error of a mere ten percent load is a very small error indeed. The other is that the tolerance system also serves to determine the desirability of returning to a full load test.

In the event that narrower tolerances should be decided upon, there is a problem in connection with the time required for resetting the digital counter. The relay actions are fast, but the rapidity of pulses generated by the teeth does not allow much time. It might prove to be desirable to have the two or three preset numbers remain preset all during a test, the necessary connections for each being carried to a separate coincidence-actuated trigger unit. There would then be three distinct outputs, and some circuit changes could be expected to be advantageous.

In the event that the large number of contact-making relays in the illustrated form of the invention should prove to cause malfunctioning too often, other devices (of which some are now known and others will be later developed, and many of which can be deemed relays in a broad sense) could be substituted. Of course there should then be other appropriate changes in the circuit. It may be noted, however, that the illustrated circuit has a considerable degree of "fail safe" characteristics. For example, dirty contacts of "within tolerance" relay 126 would prevent a meter from passing any test. In fact, such a malfunctioning would usually be discovered immediately because the Excessive Error lamp would be illuminated and the operator would see that the digital counter does not indicate an excessive error.

Within the broader aspects of principles underlying this invention, other analysis devices than a digital counter could be used for comparison. For example, the segmented device with some mechanical controls, disclosed in the Burkhart applications already mentioned and to be claimed in a patent continuing therefrom can be used. But the digital counter and all-electric counting and control here described give such an exceptional degree of accuracy that it is preferred. Indeed, the present invention, being in the nature of a practical working out of those broad concepts, may be said to incorporate that invention.

In spite of the length of this description, efforts have been made to keep it within reason by omitting much that is conventional or already known, such as the details of the digital counters, or which would be repetitive of material in the Burkhart applications mentioned.

The term "full load" is an industry designation of a load at which the damping magnet adjustment or "main" calibration is made. In fact, it is only a moderate load, far below (or a small fraction of) the maximum continuous load for which the meter is designed.

This invention has also been partly described in a thesis entitled Automatic Calibrator for Single Phase Watthour Meter, by one of the applicants, Richard K. O. Lee, and its disclosure is hereby incorporated herein by reference. It is available at Purdue University, in the Library of the School of Electrical Engineering.

In the claims, the term "digital counter" is not intended to require that actual visible digits be used, since the counting and resulting precise electrical control are the same whether the digits appear or not.

We claim:

1. Automatic calibrating apparatus for watthour meters having rotary adjustment devices for full load adjustment and light load adjustment including means for correlatedly energizing a production meter and a standard meter for comparison runs first with the production meter energized with full load and later with it energized at lighter load, means including a digital counter energized first for counting passing peripheral demarcations at minute intervals along the periphery of the disk of the standard meter with clear discrimination between successive demarcations, means for counting with accuracy the revolutions of the production meter disk, and for controlling the digital counter to count during a predetermined number of exact revolutions, means controlled by the digital counter in accordance with the relationship of its final count to a predetermined count indication of acceptable accuracy, to adjust the meter calibration in one direction if the count is beyond acceptable accuracy, in the opposite direction if the count is short of acceptable accuracy, and to cause the apparatus to advance to the next test if the count indicates acceptable accuracy or after correction for lack of accuracy is completed, the means for correcting the meter calibration including means for turning the appropriate adjustment device and simultaneously transmitting to the digital counter impulses so correlated as to the amount of correction being made that an amount of calibrating correction approximately necessary to overcome the particular meter error will cause the digital counter to count to a number corresponding to meter accuracy; said apparatus including means for automatically reversing the direction of both calibrating adjustment and digital counting depending on whether the meter error was slow or fast, and means actuated by the digital counter upon reaching the count corresponding to accuracy for terminating the calibrating adjustment and causing the apparatus to progress to the next test.

2. Calibrating apparatus according to claim 1 in which the last named means includes means effective in the event of a light load adjustment to cause the next test to be a full load test.

3. Automatic calibrating apparatus for watthour meters having an adjustment device including means for correlatedly energizing a production meter and a standard meter for a comparison run, means including a digital counter for counting passing peripheral demarcations at minute intervals along the periphery of the disk of the standard meter with clear discrimination between successive demarcations, means for counting with accuracy the revolutions of the production meter disk, and for controlling the digital counter to count during a predetermined number of exact revolutions of the production meter disk, correction means controlled by the digital counter in accordance with the relationship of its final count to a predetermined count indication of acceptable accuracy, to adjust the meter calibration in one direction if the count is beyond acceptable accuracy, or adjust it in the opposite direction if the count is short of acceptable accuracy.

4. Automatic calibrating apparatus according to claim 3 which includes means for operating the adjustment calibrating device and simultaneously transmitting to the digital counter impulses so correlated as to the amount of correction being made that an amount of calibrating correction approximately necessary to overcome the particular meter error will cause the digital counter to count to a number corresponding to meter accuracy.

5. Automatic calibrating apparatus according to claim 4 which includes means for automatically reversing the direction of both calibrating adjustment and digital counting depending on whether the meter error was slow or fast, and means actuated by the digital counter upon reaching the count corresponding to accuracy for terminating the calibrating adjustment and causing the apparatus to progress to the next test.

6. A calibrating apparatus according to claim 3 in which the correction means includes a full load correction motor and a light load correction motor, and having sequence control means for causing energization of the production meter with full load unity power factor for a first comparison run and causing a full load correction motor to be driven if the correction means is used, and, upon completion of the run without use of the correction means or upon completion of the correction, causing the production meter to be energized with light load at unity power factor, and causing the light load correction motor to be driven if the correction means is used, and in that event causing subsequent return to a full load test, but in the event the light load correction motor is not used causing energization of the production meter with, in successive runs, a reduced power factor full load current and a unity power factor overload current and in connection with each of said tests causing a rejection indication if the digital counter fails to indicate acceptable accuracy and after the digital counter has indicated acceptable accuracy on both overload and power factor tests causing an indication of acceptability of the meter.

7. A calibrating apparatus according to claim 3 in which the correction means includes a full load correction motor and a light load correction motor, and having sequence control means for causing energization of the production meter with full load unity power factor for a first comparison run and causing a full load correction motor to be driven if the correction means is used, and, upon completion of the run without use of the correction means or upon completion of the correction, causing the production meter to be energized with light load at unity power factor, and causing the light load correction motor to be driven if the correction means is used, and in that event causing subsequent return to a full load test, but in the event the light load correction motor is not used causing the apparatus to pass to a different stage.

8. Automatic calibrating apparatus for watthour meters including means for correlatedly energizing a production meter and a standard meter for a comparison run, means including a digital counter for counting passing peripheral demarcations at minute intervals along the periphery of the disk of the standard meter with clear discrimination between successive demarcations, means for counting with accuracy the revolutions of the production meter disk, and for controlling the digital counter to count during a predetermined number of exact revolutions of the production meter disk, means for variedly presetting the digital counter to produce an output impulse when a preset number is reached, means responsive to the first such impulse to set up the "within tolerance" circuit and a "slow error" circuit, means responsive to second output impulse to nullify the "within tolerance" circuit while retaining the "slow error" circuit and means effective at the exact instant of completion of the predetermined number of revolutions of the production meter disk for responding in three different manners depending on whether the "within tolerance" circuit is in effect and if not whether the "slow error" circuit is in effect.

9. Automatic calibrating apparatus for watthour meters according to claim 8, in which means responsive to the first output impulse changes the presetting of the digital counter to a different number.

10. Automatic calibrating apparatus for watthour meters according to claim 8, in which means responsive to the first output impulse changes the presetting of the digital counter to a different number and effective upon completion of the determined number of revolutions while the "within tolerance" circuit is not in effect for changing the presetting of the digital counter to a number between the first two numbers.

11. Automatic calibrating apparatus for watthour meters including means for correlatedly energizing a production meter and a standard meter for a comparison run, means including a digital counter for counting passing peripheral demarcations at minute intervals along the periphery of the disk of the standard meter with clear discrimination between successive demarcations, means for counting with accuracy the revolutions of the production meter disk, and for controlling the digital counter to count during a predetermined number of exact revolutions of the production meter disk, means for variedly presetting the digital counter to produce an output impulse when a preset number is reached, means responsive to the first such impulse to set up the "within tolerance" circuit, means responsive to second output impulse to nullify the "within tolerance" circuit and means effective at the exact instant of completion of the predetermined number of revolutions of the production meter disk for responding in different manners depending on whether the "within tolerance" circuit is in effect.

12. Automatic calibrating apparatus according to claim 3 including means for timing the counting by the digital counter and discontinuing the test and indicating excessive error if the count is not completed within a predetermined time.

13. Apparatus for comparing the speed of two moving parts, at least one of which has numerous peripheral demarcations and the other of which has a detectable variation including means for producing demarcation count pulses and means for producing variation count pulses, a digital demarcation counter responsive to the demarcation pulses, a variation counter responsive to the variation pulses, and a circuit including a count start relay closed by the variation counter in response to a preliminary variation pulse count, said circuit causing said relay to be energized by the next variation pulse count, and said relay causing said demarcation counter to start counting, a count stop relay and a circuit therefor connected by the variation counter after a predetermined number of counts and adapted to cause such count stop relay to be actuated by the next variation pulse, said apparatus including means which includes the demarcation counter and which is rendered effective by the count stop relay at the moment of its energization to select from a plurality of possible responses of said apparatus a particular response depending upon the count which said demarcation counter has reached.

14. Automatic calibrating apparatus including means for correlatedly energizing a production meter and a standard meter, both having a rotating elements, a comparison device, means for actuating the comparison device in proportion to the number of circumferential demarcations on the rotating element of the standard meter which pass a given point during a test run controlled by the production meter to the duration of a movement thereof calculated to stop the comparison device in a given status if the number of demarcations passing is the number indicating accurate measurement of the production meter, a motor controllable by said comparison device after the counting has been completed to actuate the comparison device to said status, including a sequence controlling device for causing a series of different comparison runs with the production meter and standard meter energized correlatedly but differently in the successive runs, and to cause said motor to remain idle after at least one of said runs regardless of the status of said comparison device, and means actuated by said motor in accordance with its movement while actuating the comparison device for operating the calibrating adjustment of the production meter.

References Cited in the file of this patent

UNITED STATES PATENTS

| | | |
|---|---|---|
| 2,601,492 | Baker | June 24, 1952 |
| 2,606,956 | Axelrod et al. | Aug. 12, 1952 |

OTHER REFERENCES

A.I.E.E. Transactions, volume 74, part 1, July 1955, pp. 367–373.